UNITED STATES PATENT OFFICE.

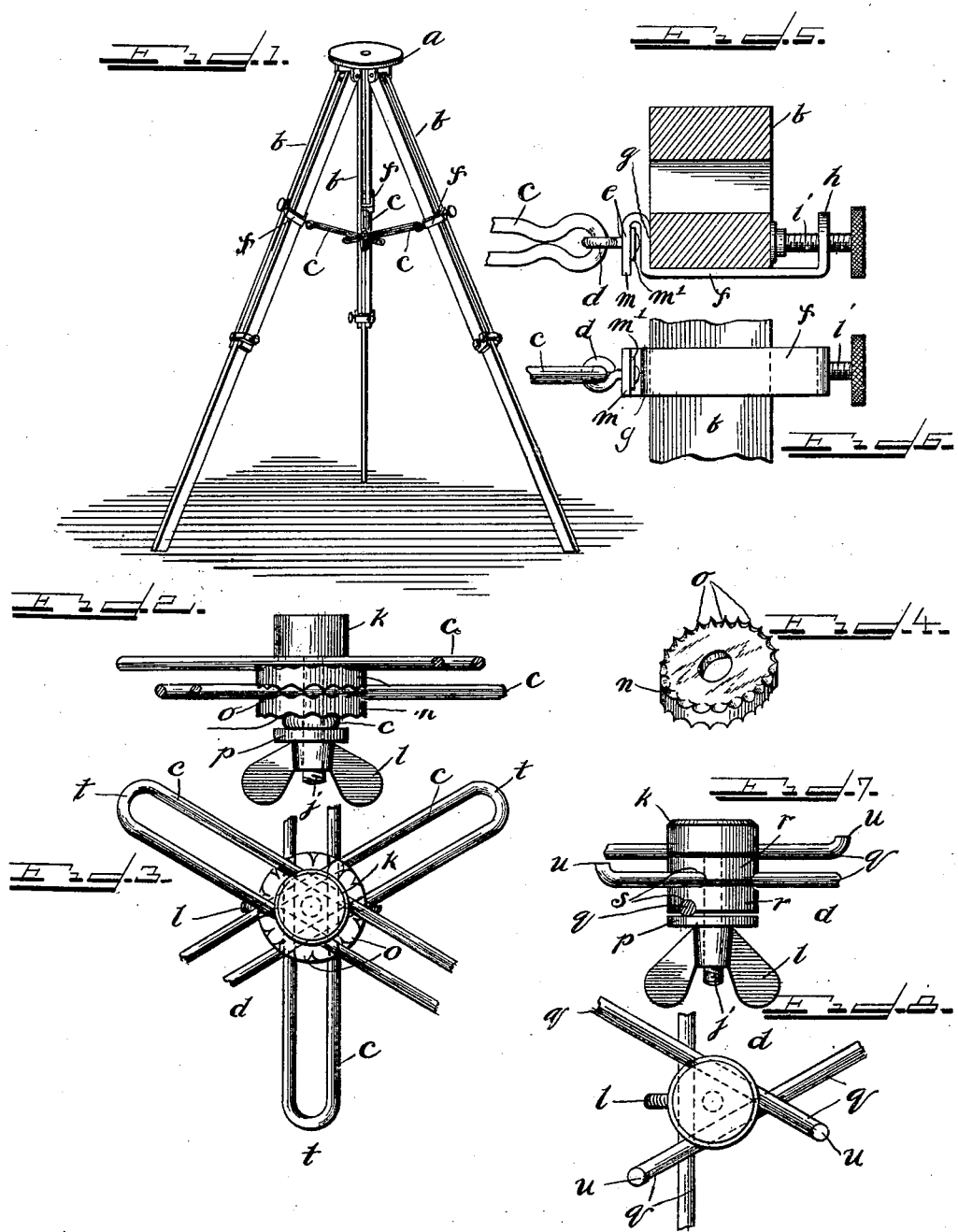

GEORGE EGBERT MELLEN, OF CHICAGO, ILLINOIS.

TRIPOD-STAY.

SPECIFICATION forming part of Letters Patent No. 679,058, dated July 23, 1901.

Application filed December 24, 1900. Serial No. 40,915. (No model.)

*To all whom it may concern:*

Be it known that I, GEORGE EGBERT MELLEN, of Chicago, in the county of Cook and State of Illinois, have invented a new, useful, and Improved Tripod-Stay, of which the following is a full, clear, and exact description, reference being had to the accompanying drawings, forming a part of this specification, in which similar letters of reference in the different figures indicate like parts.

One object of my invention is to so construct a stay for the legs of camera and other tripods that the same may be detachably and adjustably secured thereto in such a manner that the legs may be placed in any predetermined position with the lower ends at varying distances from each other in order to properly adjust the camera, and there secured, so that the instrument may not become accidentally displaced when once adjusted for use.

A further object is to so construct said stay that it may be compactly folded for transportation, all of which is hereinafter more particularly described, and definitely pointed out in the claims.

In the drawings, Figure 1 is a perspective view of a tripod having my improved stay attached thereto as it would appear in actual use. Fig. 2 is an enlarged side view in detail of my improved clamping mechanism. Fig. 3 is a plan view thereof. Fig. 4 is a detail view of one of the grooved locking-rings. Fig. 5 is a detail sectional view in plan of one of the tripod-legs, showing the detachable clamp applied thereto. Fig. 6 is a side view thereof. Fig. 7 is an enlarged side view in detail of a modified form of rod-clamp, showing the same adapted to single rods; and Fig. 8 is a plan view thereof.

Referring to the drawings, $a$, Fig. 1, represents the usual tripod-head for the support of a camera, to which head the usual extension-legs $b$ are jointedly attached. When the tripod is once adjusted to the desired position to meet the requirements of the camera, it is of the utmost importance that the legs should be rigidly secured in place. This I accomplish by means of detachable adjustable stays or braces constructed as follows: Said stays consist of three members $c$, arranged to converge at a common point, where they are united by means of a clamp $d$. Each member or brace consists, preferably, of parallel rods formed from a single piece of tubing or wire, as shown, upon the outer end of each of which is loosely attached an eye $d$, which is in turn swiveled, as shown at $e$, Fig. 5, to a flange $m$ upon a clamping-plate $f$, having the flanges $g$ $h$, arranged parallel to each other and to the flange $m$. A washer or disk $m'$ is preferably provided to prevent the swivel from wabbling. A thumb-screw $i$ is passed through the part $h$, which enables the clamp to be secured to the leg of the tripod. A clamping-bolt $j$, having a head $k$, is passed between the parallel stay-rods $c$ and is provided with a thumb-nut $l$ for tightening it. Between the three converging rods there is interposed in the manner shown loose rings $n$, each of which is provided with grooves or notches $o$ for the reception of the rods $c$. A washer $p$ is interposed between the thumb-nut and the last rod of the series. The tightening of the thumb-nut $l$ serves to lock the rods rigidly in position, said rods being firmly clamped between the grooved rings or revoluble clamping members.

The object of the grooved rings is not only to provide means for firmly grasping the rods, but to enable the latter to be severally adjusted around a common center to permit them to conform to the desired lateral movement of any one of the tripod-legs independently of the others in adjusting the camera. To those who are familiar with the varying conditions to be met in field photography it is well known that the camera cannot always be placed level with the horizon, nor can the tripod-legs be arranged equally distant from each other if the best effects are desired. Hence it follows that the lateral and other movements of the legs should not within a given range be restricted. This adaptability can only be accomplished by having the rod-clamp so constructed as to permit these varying movements, which are attained in my device by means of the grooved rings and brace-rods jointedly connected to the leg-clamps.

In Figs. 7 and 8 I have shown a modification of said invention in which single brace-rods $q$ are employed, while the rings $r$, which are the equivalent of the rings $n$, have but a single groove $s$ therein, the depth of which is less than the diameter of the rod which it is intended to receive.

When single brace-rods are used, it is not necessary to swivel them to the leg-clamps, inasmuch as they are free to turn within the grooves of the rod clamp or rings when the nut $l$ is loosened. This latter movement is very desirable in fitting and adjusting the braces to the tripod and is secured in the preferred construction by means of the swiveled eyes $e$.

When the double or parallel rods are used, as shown in Fig. 3, it is obvious that the looped ends $t$ serve to prevent the several rods from becoming disconnected from the rod-clamp. The same result is accomplished in the construction shown in Figs. 7 and 8 by enlarging or bending the ends of the rods $q$, as shown, for example, at $u$. This feature of non-separability is of considerable advantage in that it prevents the parts from being lost, while at the same time it enables the stay to be more readily adjusted to the tripod.

I recommend attaching the stay to the upper sections of the tripod-legs, as shown in Fig. 1, having demonstrated in actual practice that it is much easier to apply it there, and when so applied the tripod may be moved without placing an undue strain upon the usually slender tripod-legs. Moreover, the stay-rods when so applied may be made much shorter.

Having thus described my invention, what I claim, and desire to secure by Letters Patent, is—

1. A stay for tripods, consisting of leg-clamps, means for detachably securing one of said leg-clamps to each of the respective tripod-legs, converging rods jointedly connected with said clamps, and a rod-clamp consisting of a bolt and thumb-nut and loose interposed rings having grooves or notches formed in their meeting faces for the reception of said rods, whereby both a lateral and longitudinal adjustment may be given to the respective rods independently of each other, substantially as described.

2. In a device of the class described, the combination of stay-rods for the several tripod-legs, clamps jointedly secured to their outer ends, independent rings having grooves formed in their meeting faces for the reception of said rods, and a bolt and thumb-nut for clamping the rings and rods against each other, substantially as and for the purpose set forth.

3. In a device of the class described, the combination of a plurality of stay-rods, leg-clamps attached to their outer ends by means of a joint and swivel connection, and a clamp for engaging said stay-rods, said clamp consisting of a bolt and thumb-nut and a series of clamping members loosely mounted upon said bolt and interposed between said rods, substantially as described.

4. In a device of the class described, the combination of a plurality of braces, each consisting of parallel rods formed in a single piece, leg-clamps attached to their outer ends by means of a joint and swiveled connection, and a clamp for connecting said braces at a common point, said clamp consisting of a bolt and thumb-nut and interposed clamping-rings having grooves or notches therein for engaging said rods, said rings being free to rotate upon the bolt when not under compression, substantially as described.

5. In a device of the class described, the combination of a plurality of stay-rods, leg-clamps jointedly attached to their outer ends, a common clamp having independent revoluble members for engaging and clamping said rods, and means upon the free ends of said rods for preventing the same from becoming disengaged from said clamp when the latter is released, substantially as described.

In testimony whereof I have signed this specification, in the presence of two subscribing witnesses, this 20th day of December, 1900.

GEORGE EGBERT MELLEN.

Witnesses:
DWIGHT B. CHEEVER,
D. H. FLETCHER.